INVENTOR
Manuel A. Robbins

BY Arnold, Roylance and Harris
ATTORNEY

INVENTOR
Manuel A. Robbins
BY Arnold, Roylance and Harris
ATTORNEY

INVENTOR
Manuel A. Robbins
BY Arnold, Roylance and Harris
ATTORNEY

United States Patent Office 3,388,240
Patented June 11, 1968

3,388,240
OPTICAL CORRELATOR USING A MATCHED FILTER SYSTEM WITH RASTER TYPE DISPLAY
Manuel A. Robbins, Lutherville, Md., assignor to Martin-Marietta Corporation, New York, N.Y., a corporation of Maryland
Filed Sept. 11, 1963, Ser. No. 308,315
16 Claims. (Cl. 235—181)

This invention relates to autocorrelation detection, and more specifically to a device useful as a passive matched filter in the receiver of a reflection system such as radar.

The development by North in 1943 of the matched filter concept provided a powerful tool for the retrieval of known signals from accompanying noise. In addition to enhanced signal retrieval, a matched filter, when applied to a communication system or a reflection system, also increases the apparent range resolution of the system, and permits greater security by means of encoded signals. All of these desirable effects of the matched filter system are the result of the fact that its basic function is one of autocorrelation. The value of the matched filter as an optimizing technique is attested to by its frequent use in recent years in various communication and radar systems.

The matched filter technique comprises basically the insertion in a communication or radar receiver of a linear filter carefully constructed to have an impulse response which is precisely the time inverse of a known time-varying signal to be received. This is also often referred to as "pulse compression," since the signal emerges from the matched filter greatly compressed along the time axis.

While this technique is very valuable, its implementation, which has been by electronic means, has proven extremely difficult. The construction of a linear filter whose impulse response matches precisely, in a time inverse fashion, the waveform of a given signal is a very exacting task. The difficulty of constructing individual electronic filters having the appropriate characteristics is multiplied when it is desired to provide a system having the capability of receiving more than one configuration of known signal, since a separate passive filter must then be constructed corresponding to each desired signal.

It is an object of this invention to provide a matched filter system which is both accurate and easy to construct.

It is a further object of this invention to provide a matched filter system in which the filters may be easily and quickly changed so that the system may accommodate more than one input signal.

These objectives are achieved in one embodiment of this invention by displaying the time-varying electrical content of a radar receiver, including, of course, any reflected signal sequence appearing therein, as a space-intensity function on the face of a cathode ray tube. A photographic film, containing a transparency function replica of the signal sequence, but otherwise opaque, is placed in the path of light radiating from the display on the cathode ray tube face. This light, after passing through the film replica, is converged onto the face of a vidicon tube; and there is displayed on the vidicon face a space-intensity function representing the autocorrelation function of the signal sequence. The vidicon beam scans this optical autocorrelation function off the vidicon face and converts it to an electrical signal. This electrical signal, comprising the output of the optical matched filter, contains information both as to the existence and time-position of an input signal sequence.

The electrical content of the radar receiver channel, or the content of any receiver channel, is conveniently displayed as a space-intensity function on the face of a cathode ray or similar tube in the form of a rectangular raster of sequentially painted parallel lines similar to a television raster. A signal sequence of substantial length so located that it is split, with one part appearing at the end of one raster line and the other part appearing at the beginning of the next raster line, creates a problem, since each portion of the signal sequence tends to be correlated separately with the replica carried by the film, creating ambiguity due to two resulting displays on the vidicon face. It is a still further object of this invention to provide a matched filter system of the type described above and using a raster type display in which there is no system degradation due to split signal sequences.

It is an additional object of this invention to provide such a matched filter system suitable for use in a reflection system such as radar, which compensates for signal distortion due to frequency drift or Doppler shift of the reflected signal.

The manner in which these and other objectives of this invention are achieved may be understood more clearly by reference to the following detailed description taken in conjunction with the drawings, which form a part of this specification, and in which:

FIGS. 7-10 are schematic representations of the matched filter embodiment of FIG. 5, using a raster scan, and illustrate the development of an inventive system in which degradation due to the signals being split between two raster lines is avoided;

FIG. 8 shows a signal split between two raster lines;

FIG. 9 illustrates the vidicon limits for autocorrelation function peaks corresponding to signals wholly displayed on a single line of the cathode ray tube raster;

ANALOGY OF MATCHED FILTER TO AUTOCORRELATION FUNCTION

This invention may be more clearly understood by considering first the analogy between the output of a passive matched filter and an autocorrelation function.

Figures 1, 2, 3:
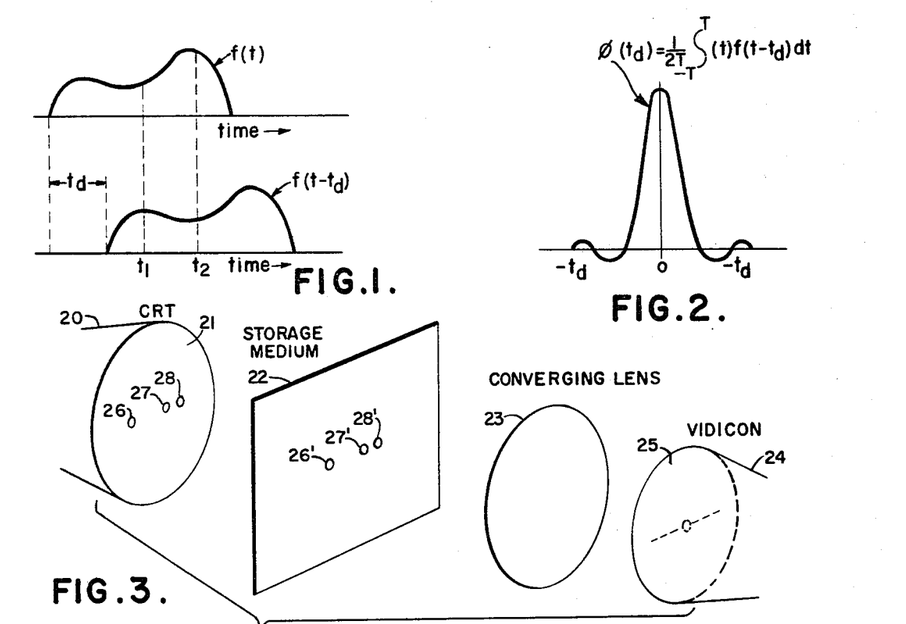
FIG. 1 is a graph of two identical functions displaced along a common axis, and illustrates the nature of the autocorrelation process.
FIG. 2 is a graph of a typical autocorrelation function.
FIG. 3 is a perspective view of a simple matched filter constructed in accordance with this invention.

Autocorrelation is a mathematical process which provides, broadly speaking, a measure of the degree to which two functions "fit" or "match" one another. In FIG. 1, there is shown a time-varying function $f(t)$ and an identical function $f(t-t_d)$ displaced along the time axis a distance $t_d$. The auto correlation, or closeness of fit, is determined by multiplying the values of the two functions at varying points $t_1, t_2, \ldots t_1$ along the common time axis. When these products $f(t_1)f(t_1-t_d)$ are summed, or integrated, over a time interval from A to B and the appropriate coefficient is inserted, the result is the autocorrelation integral of $f(t)$ corresponding to a given function displacement $t_d$:

$$(1) \quad \frac{1}{B-A}\int_A^B f(t)f(t-t_d)dt$$

Obviously, the closer displacement $t_d$ is to zero, the closer is the "fit" of the two functions, and therefore the greater the value of the autocorrelation for that particular displacement. If the displacement $t_d$ is varied from $-T$ to $T$, and the value of the autocorrelation integral resulting for each value of $t_d$ is plotted against the $t_d$ axis, the result will be the autocorrelation for the given function $f(t)$:

$$(2) \quad (t_d)=\frac{1}{2T}\int_{-T}^{T} f(t)f(t-t_d)dt$$

Both the autocorrelation integral and the autocorrelation function are properly evaluated with infinite integration limits; however, they are shown here as having finite limits, since in most practical applications, such as this one, the limits are finite, although broad enough so as not to introduce appreciable distortion for the purposes of the evaluation. A typical autocorrelation is shown in FIG. 2, with each point on the function corresponding to the value of the autocorrelation integral for a particular value of displacement $t_d$. FIG. 2 shows that the typical autocorrelation has a main lobe with a peak value at zero displacement, and the width of this main lobe is normally substantially less than the width of the function $f(t)$ which engendered it.

Turning now to a consideration of the matched filter configuration, the response (output) of any filter having an impulse response $h(t)$ to an input signal $f(t)$ can be stated:

$$(3) \quad g(T)=\int_{-\infty}^{+\infty} f(t)h(T-t)dt$$

where $t$ is a dummy variable in the time domain. For a matched filter, the impulse response is the time inverse of the input signal, or $h(T)=f(b-T)$, neglecting constant coefficients. The output of the matched filter will then be $$(4) \quad g(T)=\int_{-\infty}^{+\infty} f(t)f(b-T+t)dt$$

or, eliminating the trivial constant $b$, $$(5) \quad g(T)=\int_{-\infty}^{+\infty} f(t)f(t-T)dt$$

It will be seen that the dummy time variable $t$ in the impulse response equation is equivalent to the dummy time variable $t$ in the autocorrelation function, and that the time variable T in the impulse response equation corresponds to the time variable $t_d$ in the autocorrelation function. Thus, the impulse response (or output) of a matched filter is seen to be the same as the autocorrelation function, when taken along the time axis.

Therefore, a device for obtaining an autocorrelation function will generally be suitable for use as a passive matched filter, and a matched filter device may be understood by reference to its autocorrelation processes.

OPTICAL MATCHED FILTER

The basic components of a simple optical system for performing the function of a matched filter are seen in FIG. 3. The optical matched filter comprises a cathode ray tube (CRT) 20 having a conventional, generally planar face 21; a planar storage medium 22 spaced from face 21 of CRT 20 and parallel thereto; a converging lens 23 spaced from storage medium 22; and a vidicon tube 24 having a substantially planar face 25 which is parallel to CRT face 21 and to storage medium 22 and is located in the focal plane of lens 23.

The known signal is displayed on face 21 of CRT 20 as an intensity function, with the intensity of light radiated from the CRT phosphor being proportional to a value (such as amplitude) of the signal corresponding to a variable (such as time) which corresponds to distance on the CRT face. The storage medium 22 may conveniently be a photographic film, and it bears a replica of the known signal in the form of a transparency function. The signal replica is placed upon storage medium 22 by causing various portions of the storage medium to have varying degrees of transparency to the light radiated from the CRT phosphor. The transparency function replica on the storage medium is equal in size to the signal sequency intensity display on the face of the CRT. The storage medium transparency is related to the CRT display intensity in such a way that signal values of such a sense that they are represented by points of increased intensity on the CRT display are represented by points of greater transparency on storage medium 22. For instance, if higher signal amplitudes are represented by radiation of greater intensity from the CRT display, they are represented on the storage medium by points of greater transparency. The storage medium, other than in the region of the signal replica, is opaque and will not transmit light from the CRT display incident upon it.

Converging lens 23 is positioned with respect to storage medium 22 in such a maner that it converges upon face 25 of vidicon 24 all of the light transmitted by the CRT display which passes through the signal replica in storage medium 22. The light converged by lens 23 forms the autocorrelation function of the signal as a light intensity function upon the photoconductive mosaic of the vidicon face. The autocorrelation function remains on vidicon face 25 until it is scanned off and transduced to an electrical signal by the vidicon scanning beam.

For purposes of illustrating the operation of this optical matched filter as an autocorrelation device, a greatly simplified signal will be assumed, comprising three equal amplitude pulses, spaced in time, such that when they are displayed on CRT face 21 they comprise three spaced points of light of equal intensity 26, 27 and 28, with the rest of CRT face 21 being dark. For ease of explanation, the obviously two-dimensional characteristics of any display on a CRT face will be ignored, and it will be assumed that each of these pulses is represented on the CRT by a single point, and that the signal itself, comprising a linear array of three points, has only one dimension. The linear spacing between the points on CRT face 21 corresponds to the time spacing between the pulses in the time function.

Figures 4, 5:
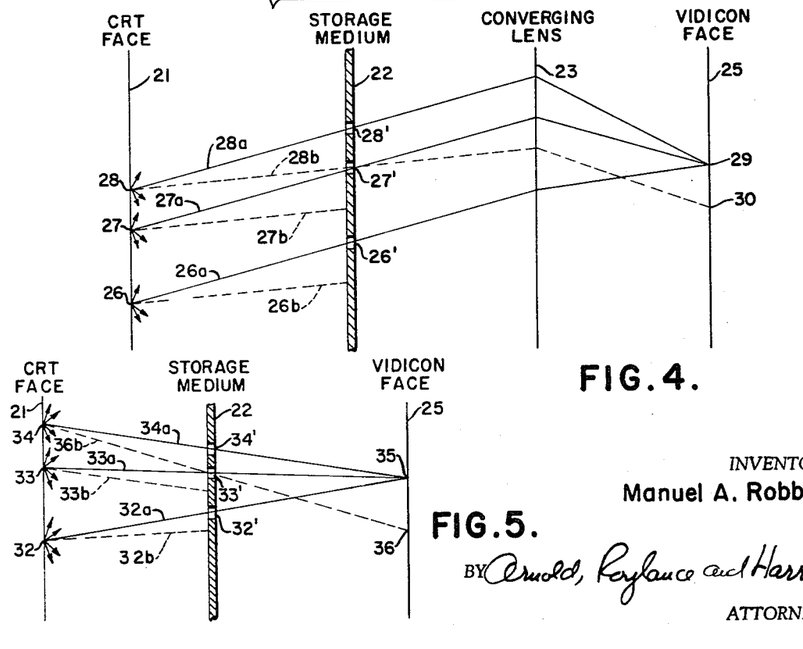
FIG. 4 is a schematic representation of the matched filter embodiment of FIG. 3.
FIG. 5 is a schematic representation of a different embodiment of matched filter than that shown in FIGS. 3 and 4.

If we assume that the signal on CRT face 21 and the replica on storage medium 22 lie in the same plane, then the schematic of FIG. 4 is taken along the plane in which both the CRT signal display and the storage medium replica lie. Points 26, 27 and 28 comprise individual incoherent light point sources, with the light from each of these points radiating with substantially equal intensity throughout a solid angle outwardly from CRT face 21, as indicated diagrammatically in FIG. 4 by the small arrows radiating outwardly from each of the points. Single replica points 26', 27' and 28' are represented in the schematic of FIG. 4 as points of complete transparency to light from the CRT phosphor in the otherwise completely opaque body of storage medium 22.

Since each of the display points on the CRT base radiates with equal energy in all directions within a limited solid angle, we may consider this radiating light in terms of groups of parallel light rays. For every ray of light emanating from one of these points, there is a parallel ray emanating from each of the other points. Since the replica is equal in size to the displayed signal, one such group of parallel rays 26a, 27a and 28a has each of its component rays directed from its originating point source on the CRT face through the corresponding transparency point in the storage medium. Since we are assuming for illustration purposes that these are points of complete transparency, there is no attenuation of the light passing through the storage medium at those points, and these three rays 26a, 27a and 28a arrive at converging lens 23 undiminished.

It is a characteristic of a converging lens that it will converge any group of parallel rays within a limited incident angle at a single point in its focal plane. Therefore, rays 26a, 27a and 28a are all directed by lens 23 to a single point 29 on vidicon face 25. Since each of these rays arrives at vidicon face 25 undiminished in intensity, the light intensity at point 29 is the sume of the original intensity of each of the three rays. It is obvious that point 29 comprises the maximum point, that of greatest intensity, in the autocorrelation intensity function displayed on the vidicon face.

That this must be so is obvious from the fact that every other group of parallel light rays emanating from points 26, 27 and 28 is incident upon converging lens 23 at a slightly different angle, and therefore is focused upon vidicon face 25 at a point spaced from point 29, and furthermore that each other group of rays is attenuated to some degree by storage medium 22. If we consider another such group of parallel rays, 26b, 27b and 28b, we will see that while ray 28b is at such an angle that it passes through transparency point 27' of storage medium 22, and therefore arrives undiminished at point 30 on vidicon face 25, the other two rays 26b and 27b are not incident upon storage medium 22 at points of transparency, and are completely blocked. Therefore, since only ray 28b of this group is incident upon vidicon face 25 at point 30, the light intensity at point 30 is one-third of the light intensity at point 29. Similarly for each and every other group of parallel rays emanating from the intensity display points on the CRT face.

If we compare the optical process described in FIG. 4 with the mathematical process described in obtaining the autocorrelation integral and autocorrelation function in FIGS. 1 and 2, we see that the operation of each separate ray of light is directly analogous to taking the product of the values of the two functions in FIG. 1 at a particular point in time. Thus, each ray of light corresponds to a particular vertical dotted line at times $t_1$, $t_2$, etc. in FIG. 1, and the action of converging lens 23 in focusing each group of rays upon a single point on the vidicon face is analogous to summing each of the products in FIG. 1 for a particular value of delay $t_d$. The light intensity incident upon the vidicon face at a single point, therefore, is analogous to the autocorrelation integral for a single value of displacement, or time delay, between the two functions being correlated, and corresponds to a single point on the autocorrelation function. The intensity display painted on the vidicon face by the sum of all the converged groups of parallel light rays is the autocorrelation function of the signal portrayed as a space-intensity function, with the intensity of light at each point being analogous to the amplitude at each point on the autocorrelation function of FIG. 2.

Since each point on the autocorrelation intensity function appearing on vidicon face 25 corresponds to a group of light rays emanating from CRT face 21 at a slightly different angle, it is obvious that to avoid distortion of the autocorrelation function, light must radiate from each point on the CRT face with substantially equal intensity in all directions. Light from a CRT phosphor radiates in a substantially cosine pattern throughout a reasonable solid angle in front of the CRT face, so that the equal intensity requirement is substantially fulfilled and there is a minimum of distortion of the autocorrelation function display on the vidicon face due to variations in the CRT face angular radiation characteristics.

In the greatly simplified example described above, the three points 26, 27 and 28 of the intensity function displayed on CRT face 21 were all of maximum intensity, and the rest of the CRT face was not illuminated; similarly, the three transparency points, 26', 27' and 28' of the signal replica comprised points of absolute transparency in storage medium 22, which was elsewhere completely opaque. For a realistic signal, most of the display points on the CRT face would have an intensity located between the two extremes of no illumination and maximum intensity illumination; likewise, most of the points on the storage medium signal replica would have a transparency somewhere between the extremes of complete opaqueness and absolute transparency.

While the intensity function CRT display representing the signal is shown clearly in FIG. 3 for purposes of illustration, in a practical system the signal will seldom, if ever, be visible on the CRT face. Since the main purpose of the matched filter is to distinguish a signal from accompanying noise, the signal as displayed will normally be surrounded by and overlaid by noise. Because of the power of the matched filter device in extracting a signal from noise, signal levels for which the device is useful will commonly be so low that the signal will not be distinguishable from the noise on CRT face 21 by an observer, since the signal to noise capabilities of observer integration are far smaller than those of the matched filter.

While the description above of the operation of the optical matched filter has been given with respect to an illustrative signal having only one dimension, and resulting in a one-dimensional autocorrelation function appearing on face 25 of vidicon 24, its extension to two-dimensional signals and replicas is obvious. Since light radiating from the CRT face display radiates throughout a solid angle, any two-dimensional signal displayed on the CRT face will cooperate with a corresponding two-dimensional replica in the storage medium to provide an appropriate two-dimensional autocorrelation function on the vidicon face. Note that it is not necessary that a signal display on the CRT face and the replica on the storage medium be aligned in any specific manner: they may be displaced horizontally or vertically from each other. The only requirement is that the signal replica lie wholly within the solid angle of equal intensity radiation for substantially all of the points on the CRT display.

In the embodiment shown in FIGS. 3 and 4, the replica is of the same size as the intensity display on the CRT. It is not necessary that the replica be identical in size to the signal as displayed on the CRT. As long as the replica lies within the solid angle of equal intensity radiation from each point of the CRT display and all of the signal display radiation passing through the replica is converged by the lens on the vidicon face, then the autocorrelation function will be painted on the vidicon as a space-intensity function.

It is not necessary that radiation within the visible light range be used to generate the autocorrelation function. While the use of visible light is convenient because of the ready availability of the necessary hardware components, such as cathode ray tubes, vidicons, photographic transparencies and light lenses, the principle of operation applies to any radiation within the electromagnetic spectrum.

The optical matched filter not only provides an indication of the existence of a signal on the CRT display by virtue of the creation of the appropriate autocorrelation function on the vidicon face, but the position of the autocorrelation function on the vidicon face provides information as to the physical location of the signal on the CRT face. This may be seen from an examination of the schematic of FIG. 4. Note that for the particular position of points 26, 27 and 28 of the signal on CRT face 21 there corresponds one and only one point 29 on the vidicon face at which the maximum intensity point (peak) of the autocorrelation function will be developed. If the signal on the CRT face were shifted in position, the appropriate bundle of parallel rays which pass through corresponding points in the storage medium replica would be collected at a point on vidicon face 25 spaced from point 29. For any specific signal sequence, the position of some fixed point on that signal, say the start of the signal, corresponds in a one-to-one relationship with a specific point on the vidicon face at which the maximum of the corresponding autocorrelation function will be displayed. Thus if the content of a receiver channel containing both signals and noise is painted on the CRT face, with position on the CRT face a function of time and intensity of display a function of amplitude, there may be obtained from vidicon face 25 information both as to the existence of a signal in the channel content and the position of that signal in time.

The decay characteristics of the CRT phosphor prevent an entire signal from ever being displayed with its true intensity at any given instant of time. Except for extremely long persistence phosphors, whose use is generally inconvenient because it precludes rapid reuse of the CRT face, the intensity of the portion of the signal first painted will have already decayed appreciably by the time the end of the signal is being painted on the CRT. Thus, in FIG. 3, if we assume that the signal is painted on CRT face 21 by a linear scan moving from left to right, by the time point 28 is being painted on the face, the intensity of point 26 will have already decayed appreciably from its original value. While any distortion due to such decay will, of course, depend upon the decay characteristics of the particular phosphor used, in general such distortion may be minimized by making use of the storage capabilities of a vidicon tube.

In general, any light incident upon the face 25 of a vidicon 24 will be stored there until swept off by the vidicon scanning beam. If the storage time before scanning off the signal is made long enough, phosphor decay distortion may be minimized. Thus, if we assume a single line scan on face 21 of CRT 20, the beginning of the line will be substantially decayed by the time the end of the line is painted on the face. However, if the resulting line on vidicon face 25 is left there until the last portion of the CRT line has decayed to substantially zero, then each point in the CRT display line will have contributed to the vidicon display illumination proportional to its intensity, with the illumination contributed by each point on the CRT face being integrated on the vidicon face from its point of initial application to the CRT face at maximum intensity, down to the point where it is substantially extinguished due to the phosphor decay. Any distortion may be still further minimized by using a phosphor whose decay rate is independent of the initial excitation intensity, such as Du Mont phosphor P7.

In FIG. 5, there is shown a schematic representation of another configuration of optical match filter in which the converging lens is eliminated. The general operating principle of the lensless device is similar to that of the configuration shown in FIGS. 3 and 4, except that the converging of the light rays radiating from the CRT face upon the vidicon face is effected by the geometry of the device rather than by a lens.

For purposes of illustrating the operation of this embodiment, we will assume a simplified signal comprising a linear array of three spaced pulses resulting in a linear, one-dimensional display of three spaced points of equal intensity 32, 33 and 34 on face 21 of the CRT. Storage medium 22 is parallel to and spaced from CRT face 21, and vidicon face 25 is spaced from and parallel to the storage medium on the other side from the CRT face. The signal replica on storage medium 22, comprising points of transparency 32′, 33′ and 34′, instead of being equal in size to the signal display on the CRT as in the configuration of FIGS. 3 and 4, is substantially smaller than the signal display. The CRT, the storage medium, and the vidicon are so spaced that the three rays of light 32a, 33a and 34a which radiate from their respective points of origin on CRT face 21 and pass through transparency point 32′, 33′ and 34′, respectively, corresponding to the points of origin on the signal display, all converge at a single point 35 on vidicon face 25.

That this arrangement results in the painting upon the vidicon face of the autocorrelation intensity function of the displayed signal may be seen heuristically by considering the radiation from the three-point light sources, instead of as groups of parallel ray bundles as was done with respect to the configuration of FIGS. 3 and 4, as groups of light rays each of which tends to converge at a different point upon vidicon face 25. We have already seen that for one light ray 34a emanating from point 34, there correspond two other light rays 32a and 33a from the other two point sources, all three of which pass through their corresponding transparency points 32′, 33′ and 34′ to define the point 35 of maximum intensity of the autocorrelation function on the vidicon face. Now, corresponding to each other ray, 34b, 34c, . . . , 34i emanating from point 34, there will correspond a separate ray from each of points 32 and 33 which will converge at a separate point on the vidicon face.

For instance, if we pick light ray 34b emanating from point 34 on the signal display, it passes through transparency point 33′ undiminished and is incident upon vidicon face 25 at point 36. Corresponding to this ray 34b, there is a ray 33b emanating from point 33 and which would normally converge with ray 34b at point 36. However, ray 33b is incident upon the opaque portion of storage medium 22 and does not reach the vidicon face. Similarly for ray 32b, emanating from point source 32, which also is completely blocked by the storage medium and prevented from reaching point 36. Point 36 will thus be illuminated by only one-third of the light intensity illuminating point 35. For each point other than point 35, therefore, the intensity of the display upon the vidicon face will be less, and point 35 will obviously be the point of maximum intensity of the autocorrelation intensity function.

In both of the embodiments of optical matched filters shown and described thus far, the use of a storage medium such as a photographic transparency to provide the matching signal information provides facility in changing the system to accept more than one known signal. Replicas of a number of different signals may easily be placed upon a single strip of photographic transparency, for instance, and the position of the strip may be quickly changed to present a different replica to the CRT display. A very large number of replicas on photographic film will occupy minimal space, as compared with the necessity, in an electronic matched filter system, of providing a bulky electrical filter for each signal which may be used. The advantage of being able to switch quickly to any one of numerous signals is obvious in systems where secrecy of transmission is important.

RADAR SYSTEM WITH OPTICAL MATCHED FILTER

Figure 6:
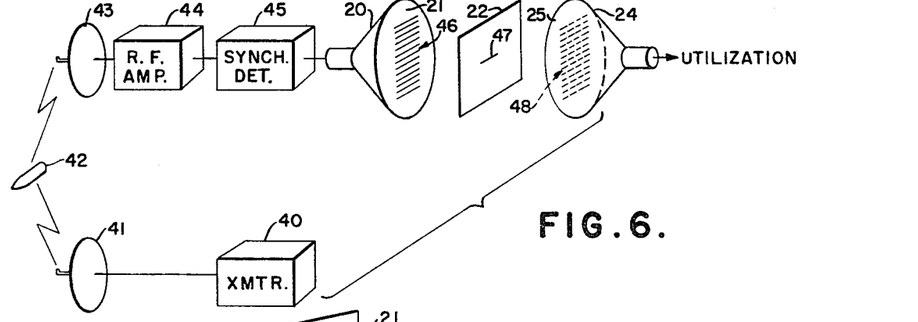
FIG. 6 is a block diagram of a portion of a typical radar system, showing the matched filter embodiment of FIG. 5 incorporated therein.

While the optical matched filter of this invention may be used in almost any type of communication system, it is especially valuable in reflection systems such as radar. In FIG. 6, there is shown a simple radar system utilizing the lensless matched filter embodiment of FIG. 5. Transmitter 40 transmits via transmitting antenna 41, a carrier frequency signal modulated by a particular time-varying code sequence, comprising the known signal. The radiation from antenna 41, after reflection from target 42, is picked up by receiving antenna 43 and fed to radio frequency amplifier 44 in the receiver. The carrier signal and its modulation, after amplification in R.F. amplifier 44, is fed to synchronous detector 45 where the modulation is removed from the carrier and fed into CRT 20. The definition of a CRT is not sharp enough to permit display of both carrier frequency energy and its modulation on a reasonable time scale, so that demodulation is necessary.

The signal and its accompanying noise are painted on CRT face 21 by the beam in such a manner that position on the CRT face is a function of time, and intensity is a function of a signal parameter such as amplitude or frequency. The signal line display shown for illustration purposes in the embodiments of FIGS. 3, 4 and 5 is not normally adequate for a practical display, since by the time the beam sweeps to the end of the single line, the phosphor at the beginning of the line will not have decayed to a low enough intensity to permit the beam immediately to begin its retrace. For this reason, a more complex scan pattern is generally desirable. A preferred pattern is a raster 46 of sequentially painted parallel lines, similar in appearance to a television raster. The CRT beam paints the uppermost raster line from left to right, and flies back to paint the second line, again from left to right, and so on to the bottom line of the raster, after which the beam returns to the top of the CRT to repaint the raster.

The size of the raster is largely determined by the CRT phosphor decay characteristics, since the raster need only be large enough so that the CRT beam consumes sufficient time in describing it for the initial line of the raster to have decayed substantially completely before the beam completes the end of the raster and starts to repaint it.

Since, as described previously, for each space on CRT face 21 there corresponds a space on vidicon face 25, light radiated from the lines of raster 46 and passing through signal replica 47 in storage medium 22 will paint a corresponding raster 48 on vidicon face 25. The geometry of the configuration dictates that the positions of the two rasters are inverted with respect to each other, i.e., the top line of CRT raster 46 corresponds to the bottom line of vidicon raster 48, and the left-hand side of raster 46 corresponds to the right-hand side of raster 48.

CRT raster 46 comprises a space-intensity representation of the signal and noise content of the receiver channel after detection in synchronous detector 45. Vidicon raster 48 is a space-intensity representation of the correlation of CRT raster 46 with replica 47, and the presence of a signal sequence in any of the lines of CRT raster 46 will be indicated by the autocorrelation function, with its characteristic high intensity main lobe, appearing in the corresponding line and at the corresponding linear position in the vidicon raster.

The vidicon scanning beam then scans vidicon face 25, converting the light stored there to an electrical signal. As mentioned previously, the time delay between the acquisition of the light information by vidicon face 25 and the scannnig off of this information by the vidicon beam is adjusted to compensate for the CRT phosphor decay characteristics. The electrical output from the vidicon is then fed to utilization circuitry where the target information contained therein may be utilized in a number of different ways, depending upon the purpose of the radar. The vidicon output contains information both as to the existence of a target, which is indicated by the presence of high peaks corresponding to the autocorrelation function, and as to the position of the target signal in time, indicated by the relative position of the autocorrelation of the autocorrelation function on the vidicon raster 48.

While the radar system of FIG. 6 has been shown with the lensless matched filter device of FIG. 5, the matched filter embodiment of FIGS. 3 and 4, including the converging lens, could equally well be used.

REMOVAL OF SPLIT SIGNAL AMBIGUITY IN RASTER

Figure 7:
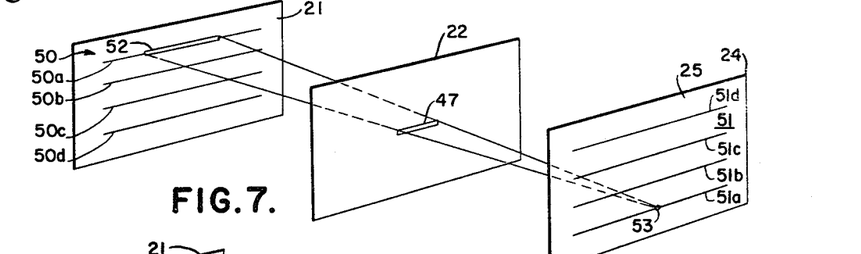
FIG. 7 shows a single signal located wholly on one raster line.

FIG. 7 shows schematically the lensless embodiment of the matched filter with a four-line raster 50 being displayed upon CRT face 21. A corresponding four-line raster 51 appears on face 25 of the vidicon 24. If raster 50 is described by an electron beam in the CRT moving from left to right and from top to bottom as viewed in FIG. 7, the lines of raster 50, comprising 50a, 50b, 50c, and 50d, wil be painted in that order upon the face 21 of the CRT, and the lines 51a, 51b, 51c, and 51d of vidicon raster 51 will be described upon face 25 of vidicon 24 in that order by light radiating from CRT raster 50 through replica 47 on storage medium 22.

If a signal 52 appears wholly upon a single line of raster 50, such as in FIG. 7 where signal 52 is shown located approximately in the center of upper raster line 50a, then radiation from the signal passing through replica 47 converges at a point 53 on the corresponding line 51a of vidicon raster 51 to provide a single autocorrelation function peak. This provides a clear and unambiguous indication both of the existence of signal and of its location.

Figures 8, 9:
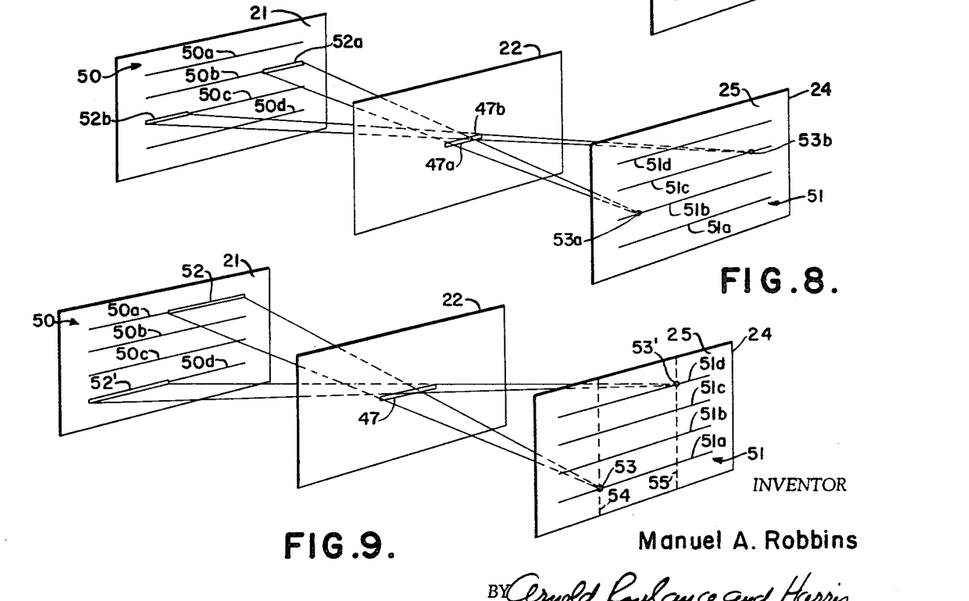

However, if the incoming signal should occupy a position in time such that it is split between two succeeding raster lines, then there appear on the face of the vidicon two autocorrelation function peaks corresponding to the one signal. In FIG. 8, the same system is shown as in FIG. 7, but signal 52, instead of appearing wholly upon a single line, is split between two raster lines. The first half 52a of signal 52 appears at the end of raster line 50b, and the second half 52b of signal 52 appears on the front half of raster line 50c. The front half 52a of signal 52 will correlate with the corresponding front half 47a of replica 47 to produce a peak 53a near the left-hand end of vidicon raster line 51b. The rear half 52b of signal 52 will correlate with the corresponding rear half 47b of replica 47 to produce a peak 53b near the right-hand end of vidicon raster line 51c. The appearance of two autocorrelation function peaks on the face of the vidicon for a single signal results in ambiguity, but more important, the intensity of each of the peaks is considerably below the intensity of the single peak 53 which results from autocorrelation of the complete signal 52 with replica 43, as in FIG. 7, with the degree of intensity degradation depending upon the division of energy in signal 52. Thus the appearance of the split peaks results in degradation of the ability of the matched filter to distinguish a signal from noise.

In FIG. 9, a signal 52, whose length is half that of the raster lines, is shown at the right-hand end of raster line 50a and the correlation peak 53 resulting therefrom is located toward the left-hand end of the corresponding raster line 51a on vidicon face 25. For a signal of the same length located at the left-hand extreme of the raster, such as signal 52' located at the left-hand end of raster line 50d on CRT face 21, the corresponding correlation peak 53' will be located toward the right-hand end of the corresponding vidicon raster 51, on line 51d. It will be obvious that the positions of peaks 53 and 53' on vidicon face 25 in FIG. 9 represent the extreme positional limits of correlation peaks for signals which appear wholly upon a single CRT raster line. The area on vidicon face 25 in which these unsplit peaks will lie, then, will be defined by dashed lines 54 and 55 extending vertically through correlation peaks 53 and 53', respectively. Thus, for a given confiuration of the CRT, storage medium, and vidicon, and for a given length of signal 52, there will exist two lines 54 and 55 such that any autocorrelation peaks appearing on vidicon face 25 in the space between these two lines will correspond to signals 52 which are wholly located upon a single raster line, and will thus be full strength autocorrelation peaks. Any peaks appearing outside of these two lines will correspond to a split signal and will be of weaker intensity.

Figure 10:
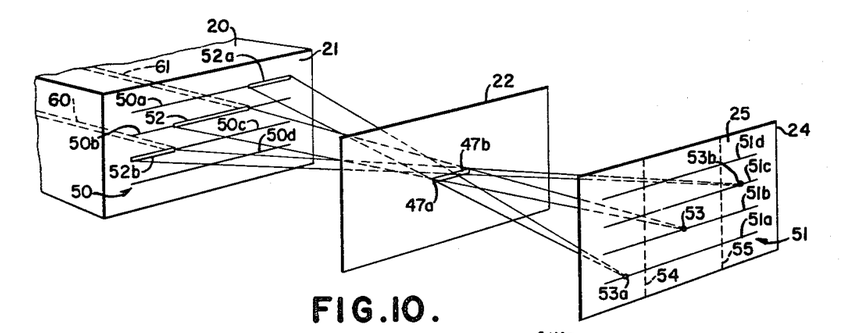
FIG. 10 shows the inventive embodiment used to avoid system degradation due to split signals.

In FIG. 10, CRT 29 uses dual electron beams 60 and 61 to paint an interlaced raster on CRT face 21. Four-line raster 50 comprises a two-line raster of lines 50a and 50c which are painted by beam 60 and an interlaced two line raster of lines 50b and 50d painted by beam 61. Beams 60 and 61 are modulated by the same information, but they are displaced linearly a distance equal to the width of a signal 52, with beam 61 trailing a signal's width behind beam 60. Thus, each of the two interlaced sub-rasters which make up raster 50 contain duplicate information, and since the length of signal 52 is one-half of the raster length, any incoming signal 52 will always be displayed wholly upon one of the two sub-rasters.

In FIG. 10, both beams 60 and 61 have just completed painting signal 52 upon CRT face 21. Beam 60 has painted signal 52 as two split sections 52a and 52b upon raster lines 50a and 50c, respectively; and beam 61 has painted signal 52 wholly upon raster line 50b. With the two beams so spaced, if the signal painted by any one beam is split between two raster lines, the same signal will be painted by the other beam wholly upon a single raster line. Thus, if the vidicon scan is restricted to that area between dotted lines 54 and 55 which contains only unsplit autocorrelation peaks, each signal 52 will be represented within that area by a single unsplit peak. This may be seen in the example shown in FIG. 10 by the fact that signal 52 is represented by autocorrelation peak 53 in raster line 51b on face 25 of the vidicon; while split peaks 53a and 53b on vidicon raster lines 51a and 51c, respectively, correspond to sections 52a and 52b of the split signal painted by beam 60 and lie outside the area scanned by the vidicon beam.

If the vidicon beam is constrained to the area between lines 54 and 55 and if it moves within that area from right to left and from bottom to top as viewed in FIG. 10, and if it moves with a velocity twice that of beams 60 and 61 of CRT 20, then the autocorrelation peaks will be scanned from face 25 of the vidicon with the time relationship between them preserved. This follows from the fact that, confining ourselves to the area between lines 54 and 55, two vidicon raster lines correspond in time to a single CRT line. This may be seen from the fact that if a signal 52 is located on CRT raster line 50a with its left-hand end corresponding to the beginning of the raster line, the corresponding autocorrelation peak is located on vidicon raster line 51a at line 55. If signal 52 is then moved half of the raster length, that is to a position where its left-hand edge is in the middle of raster line 50a, then the corresponding autocorrelation peak appears on vidicon raster line 51a at line 54. Thus, a time lapse equivalent to one-half of the CRT raster line sweep is equivalent on vidicon face 25 to the distance between lines 55 and 54 along one vidicon raster line.

The same result may be obtained on the face 21 of CRT 20 by having the two CRT beams 60 and 61 occupy the same horizontal positions, spaced one raster line apart vertically, and by delaying electronically the input to one of the two beams by a time equal to the time occupied by a signal 52.

It will be obvious that as long as the signal length is not greater than one-half the raster length, this procedure will always result in any input signal being presented wholly upon a single raster line, and having its autocorrelation peak located in the desired zone of vidicon face 25. However, if the length of displayed signal 52 is less than one-half of a raster line, there may result duplication of correlation peaks, in that a single signal may appear wholly on two adjacent lines of the CRT raster and have two autocorrelation peaks on two adjacent lines of the vidicon raster within lines 54 and 55. It may thus be necessary, in order to avoid ambiguity in the vidicon electrical output, to scan the vidicon space with two scanning beams spaced so that they will intercept duplicate autocorrelation peaks simultaneously, and to sum their electrical outputs.

CORRECTION FOR DOPPLER SHIFT OR FREQUENCY DRIFT

If the signal sequence is used to modulate a carrier, as is normally the case in reflection systems such as radar, a Doppler shift in the frequency of the received carrier caused by relative movement between the target and the transmitting antenna, or a drift in either the frequency of the transmitter or of the receiver detection system, will result in distortion of the demodulated signal which is presented to the matched filter. Thus, if the transmitted signal is $f(t)$, and the frequency differential due to the Doppler shift or to drift is $\omega_d$, then there will be presented to the matched filter, not $f(t)$ but the function $$\cos(\omega_d t + \varphi) f(t)$$

where $\varphi$ is the phase angle.

Figures 11, 12, 13:
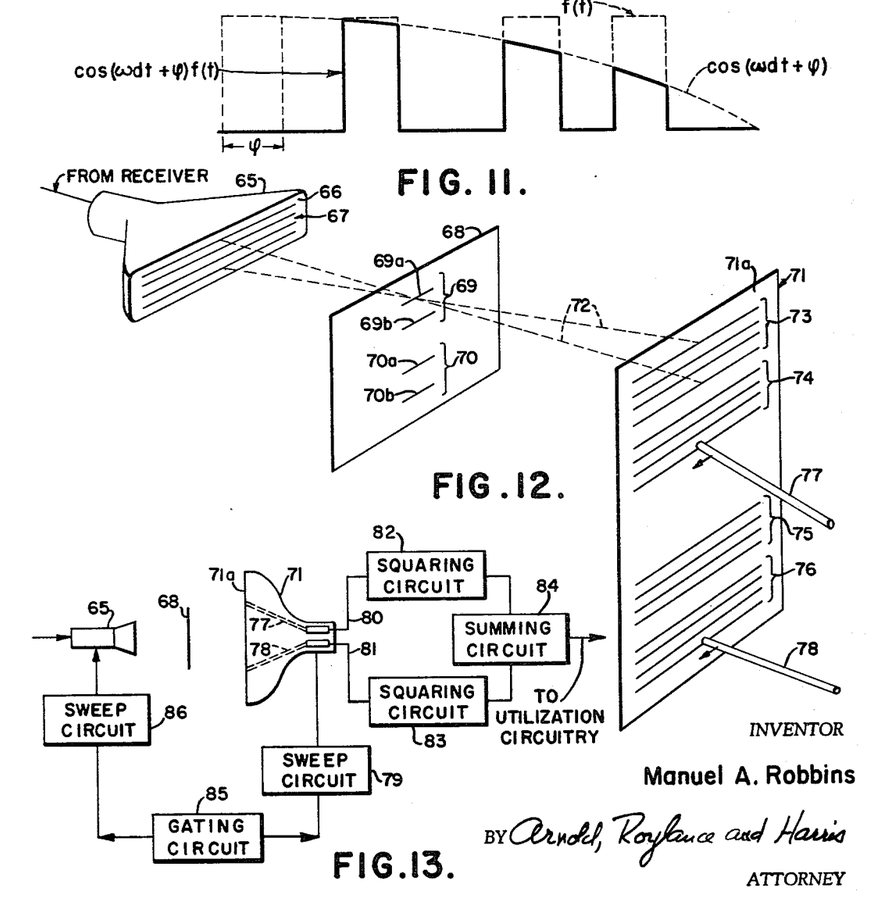
FIG. 11 is a graphical illustration of the distortion of a signal by Doppler shift.
FIG. 12 is a perspective view of a matched filter embodiment which avoids system degradation due to Doppler shift.
FIG. 13 is a block diagram of a portion of a radar set incorporating the matched filter embodiment of FIG. 12.

The effect of this distortion by the cosine of the difference frequency upon a simplified signal is shown in FIG. 11. The function $f(t)$ shown in FIG. 11 comprises three pulses of equal height spaced as shown, and is similar to the simplified signal shown in connection with FIGS. 3, 4 and 5. The effect of the distortion by the difference frequency, as may be seen, is to clip off the tops of the pulses.

While the signal in FIG. 11 is considerably distorted by this difference frequency, it will be noted that it does retain its basic character. This will be true as long as a quarter wavelength of the difference frequency is relatively long with respect to the length of the signal sequence, as is true in FIG. 11, and as long as the phase $\varphi$ is such that a zero point of the cosine function does not occur in the middle of the signal sequence. If, by controlling frequency drift and accurately anticipating Doppler shift, the difference frequency is maintained relatively low, so that a quarter of its wavelength is long with respect to the signal sequence, then the intensity function displayed on the CRT face is not unduly distorted, and is probably usable without correction. This is so even though the phase of the modifying difference frequency is unknown, and the zero point may appear in the center of the signal sequence. The phase $\varphi$ of the difference frequency, while unpredictable, changes throughout the history of a typical radar problem, so that while its position may result in distortion at some particular instant, the received signal will not remain permanently distorted.

The embodiment of the matched filter described below is designed to correct for distortion due to an unknown difference frequency $\omega_d$ of unpredictable phase, where the difference frequency is relatively high and appreciable signal sequence distortion would result unless correction were provided.

In FIG. 12 there is shown a CRT 65 having an elongated face 66 whereon is displayed a four-line raster 67. On storage medium 68 there are displayed two banks 69 and 70 of transparency functions. Bank 69 is the sine bank and each of the transparency functions 69a and 69b contained in it is of the from $\sin(\omega_1 t) f(t)$, where $\omega_1$ represents the region of frequency uncertainty, i.e., the region of frequencies in which frequency difference is to be expected to fall, and the particular values of $\omega$ for each of the functions in the sine bank are chosen so that they cover the area $\omega_1$ of frequency uncertainty in roughly equal steps. Thus, transparency 69a would be of the form $\sin(\omega_1 t) f(t)$ and 69b would be $\sin(\omega_2 t) f(t)$ where $\omega_1$ and $\omega_2$ represent two frequencies equally spaced within the region $\omega_1$ of frequency uncertainty. Bank 70 is the cosine bank and contains the same number of transparency functions as does sine bank 69. Each cosine transparency function of cosine bank 70 corresponds to a sine function transparency in sine bank 69. Thus, for cosine transparency functions 70a and 70b, function 70a corresponds to sine function 69a and is of the form $\cos(\omega_1 t) f(t)$ and cosine functions 70b corresponds to sine function 69b and is of the form $\cos(\omega_2 t) f(t)$. While each bank is shown as containing only two functions for simplicity of illustration, in a practical system each bank would contain a large number of functions to cover the area of frequency uncertainty adequately.

A vidicon 71 having a vertically elongated face 71a is placed in the path of radiation from CRT raster 67 which passes through the transparency functions of storage medium 68, to form the lensless matched filter configuration described above. The transparency functions are so spaced on storage medium 68 that raster 67 on CRT 65 projects a separate raster upon the face 71a of vidicon 71 through each individual transparency function 69a, 69b, etc. Thus, as shown by dashed lines 72, the uppermost raster 73 on vidicon face 71a corresponds to the projection of CRT raster 67 through the uppermost transparency 69a in sine bank 69. Vidicon raster 74 similarly corresponds to the projection of raster 67 through the lower of the two sine bank transparencies 69b. Correspondingly, the two lower vidicon rasters 75 and 76 correspond to CRT projections through the two transparencies 70a and 70b, respectively, in cosine bank 70.

There is displayed on CRT raster 67 a signal sequence intensity function distorted by a frequency difference $\omega_d$, having a phase $\varphi$. If the frequencies $\omega_1$ and $\omega_2$ of the sine and cosine functions cover the area $\omega_i$ of frequency uncertainty in small increments, then either the $\omega_1$ or the $\omega_2$ pair of sine and cosine replicas correspond, if not exactly, then at least closely, in frequency to the frequency difference $\omega_d$. That is, for any difference-frequency-distorted signal on face 66 of CRT 55, there will correspond a particular pair of sine and cosine transparencies on storage medium 68.

Assume that $\omega_d$ equals $\omega_1$ and the intensity function display on CRT raster 67 corresponds to transparencies 69a and 70a. Since the four raster lines of each vidicon raster correspond in inverted order to the four raster lines of CRT raster 67, there is displayed on the appropriate raster line of upper vidicon raster 73 the intensity function $\sin(\omega_1 t + \varphi)\phi[f(t)]$ where $\phi$ is the autocorrelation function. There appears at a corresponding point on vidicon raster 75 the intensity function $\cos(\omega_1 t + \varphi)\phi[f(t)]$. If these two intensity functions are simultaneously converted from an intensity display to an electrical signal, squared and then added, the result is $$[\sin^2(\omega_1 t + \varphi) + \cos^2(\omega_1 t + \varphi)]\phi^2[f(t)]$$

or since $\sin^2 + \cos^2 = 1$, the result is $\phi^2[f(t)]$, the square of the autocorrelation function of $f(t)$, unperturbed by phase or frequency differences. This procedure, performed partially optically and partially electronically, is similar to the process of quadrature detection which is normally performed electronically.

The manner in which this information is scanned from vidicon face 71a and in which the subsequent squaring and summing is performed will depend upon the requirements of the particular reflection system, and one method of accomplishing this is shown in FIGS. 12 and 13. The optical displays are scanned fom vidicon face 71a and converted to electrical information by two vidicon scanning beams 77 and 78. These two beams are swept over the vidicon rasters in synchronism by vidicon sweep circuit 79, and beams 77 and 78 are always scanning corresponding spaces in the upper, or sine group of vidicon rasters 73 and 74, and the lower, or cosine, group of vidicon rasters 75 and 76, respectively. Beams 77 and 78 will thus scan off simultaneously intensity functions $\sin(\omega_1 t + \varphi)\phi[f(t)]$ and $\cos(\omega_1 t + \varphi)\phi[f(t)]$, respectively, and convert them to electrical signals. The electrical signals from beams 77 and 78 are brought out of vidicon 71 on leads 80 and 81, respectively, and fed to the inputs of squaring circuits 82 and 83, respectively. These squaring circuits may be of any conventional design well known in the art having an output signal which is a square of the input. The output signals of squaring circuits 82 and 83 will then be the form $\sin^2(\omega_1 t + \varphi)\phi^2[f(t)]$ and $\cos^2(\omega_1 t + \varphi)\phi^2[f(t)]$, respectively. These outputs are fed to summing circuit 84, which is a conventionally designed electrical circuit for providing at its output a signal indicative of the sum of its inputs. The output of summing circuit 84 will then be the square of the autocorrelation function, unperturbed by phase or frequency variations. This signal is then fed to any desired type of utilization circuitry.

Turning again to FIG. 12, it will be seen that CRT raster 67 generates the four corresponding vidicon rasters 73–76 simultaneously. Since each of vidicon beams 77 and 78 must scan off the information from two rasters (and in a practical situation, many more than two), some provision must be made for the completion of the scanning-off process by the vidicon beams before CRT raster 67 is renewed or repainted, which would result in overlaying with new optical information those portions of the vidicon rasters from which the original information had not yet been removed. For this reason, a gating circuit 85 is provided (FIG. 13) to control the operation of both vidicon sweep circuit 79 and CRT sweep circuit 86. Gating circuit 85 turns on CRT sweep circuit 86 for a time period long enough to permit the painting of a single CRT raster 67. Gating circuit 85 then turns off CRT sweep circuit 86, and turns on vidicon sweep circuit 79, long enough for vidicon beams 77 and 78 to sweep through the vidicon rasters. Then the vidicon sweep is turned off and the CRT sweep again turned on to permit a new raster 67 to be painted on CRT face 66. The relative gating periods of the two sweep circuits will depend, of course, upon the relative speed of the two sweeps, as well as the number of vidicon rasters which must be scanned off. This interruption of the continuous presentation of receiver information will normally not create a serious problem in a radar system, since the periods of interruption will be normally very small with respect to the over-all history of a specific radar problem.

It should be noted that while the description of the optical correlator of this invention has been in terms of its use as a matched filter, that is in terms of its use as an autocorrelator for obtaining the autocorrelation function of two identical or nearly identical signal sequences, it is not so restricted, and the optical correlator serves equally well as a cross correlation device for obtaining the cross correlation function of two dissimilar functions. This follows, of course, because the correlation process is the same, whether the correlated functions are identical, in which case the process is called autocorrelation, or dissimilar, in which case the process is called cross correlation.

While particular embodiments of this invention have been shown and described, various changes and alterations which will suggest themselves to those skilled in the art are contemplated as being within the scope of the invention, which is defined solely by the claims.

What is claimed is:

1. A system for distinguishing a signal having at least one time varying parameter from accompanying noise in a receiver, comprising:
   means for presenting the signal and noise combination in said receiver as a variable intensity radiation display on a substantially planar surface, so that
   the position on said surface of each point of said display corresponds to a particular point in time, and
   the intensity of radiation from each said point is substantially constant outwardly from said surface throughout a solid angle and corresponds to the value of said at least one parameter of said combination of signal and noise at said point in time;
   radiation intensity modulating means spaced from said surface and positioned in the path of said radiation from said surface for intensity modulating said radiation in accordance with the characteristics of said signal, so that
   the position of each point on said modulating means corresponds to a particular time value of said signal and
   the degree of intensity modulation effected at each said point corresponds to the value of said at least one parameter of said signal for the corresponding time value of said signal; and
   detection means positioned in the path of said radiation after modulation by said modulating means and adapted to detect the intensity of said radiation incident upon said detection means.

2. A system in accordance with claim 1 wherein:
   said detection means includes a substantially planar detecting surface extending substantially parallel to said surface on which said variable intensity radiation is presented;

means for scanning said detection surface and detecting the intensity of said radiation incident thereon; and including further:

means for projecting said radiation from said display surface through said modulating means and upon said detection surface in such a manner that there exists a one-to-one correspondence between spaces on said radiating surface and on said detection surface.

3. A system in accordance with claim 2 wherein:
said intensity modulating means comprises a storage medium bearing a replica of said signal in the form of a portion having varying radiation transmission characteristics, in which the position of each point on said signal replica corresponds to a particular point in time, the transmissibility of said storage medium to said radiation at each said point corresponds to the value of said parameter of said signal for said particular point in time in such a way that parameter values of sense to be represented by increased radiation from said radiating surface are represented by increased radiation transmissibility of said storage medium, and said storage medium is adapted to block the transmission of said radiation everywhere but through said signal replica; and said means for projecting said radiation upon said detection surface comprises means for converging said radiation upon said detection surface;

whereby upon the appearance of said signal in a space on said radiating surface, there is projected upon a corresponding space on said detection surface the autocorrelation function of said signal in the form of radiation of varying intensity.

4. A system in accordance with claim 3 and wherein:
said means for presenting said signal and noise combination includes a cathode ray tube and means for displaying said combination upon the surface thereof; and
said detection means includes light sensitive transducer means.

5. A system in accordance with claim 3 and wherein:
said means for converging said radiation comprises a converging lens disposed between said storage medium and said detection surface.

6. A system in accordance with claim 3 and wherein:
the dimensions of said signal replica on said storage medium are smaller than the dimensions of the variable intensity representation of said signal upon said planar surface; and
said planar surface, said storage medium, and said detection surface are so disposed with respect to each other that radiation from said variable intensity representation of said signal upon said planar surface passes through said replica and converges upon said detection surface.

7. A system in accordance with claim 3 and wherein:
said variable intensity radiation display is in the form of a raster of parallel lines,
said raster comprising two sub-rasters;
the length of said signal representation in said display is not greater than one-half the length of any line in said raster;
said combination of signal and noise is displayed on both said sub-rasters, the positions of portions of said combination on one of said sub-rasters being displaced sufficiently far with respect to the positions of the same portions on the other of said sub-rasters that any signal is always displayed wholly upon a single line of at least one of said sub-rasters; and
said means for scanning said detecting surface comprises means for scanning only that portion of said detecting surface on which may appear autocorrelation functions projected from displayed signals which appear wholly upon a single raster line.

8. A system in accordance with claim 7 and wherein:
said means for presenting said signal and noise combination as a variable intensity radiation display comprises first and second beams, each painting one of said sub-rasters on said surface; and
said sub-rasters are rectangular and are interlaced to form said raster,
so that alternate lines of said raster belong to different ones of said sub-rasters, and
whereby there is projected upon said detecting surface a corresponding raster comprising two interlaced rectangular sub-rasters.

9. A system in accordance with claim 8 and wherein:
said first and second beams each paint the same combination of signal and noise simultaneously, with said beams being displaced from each other along the axis of said raster lines.

10. A system in accordance with claim 3 and wherein:
said variable intensity radiation display as in the form of a raster of parallel lines,
whereby there is projected upon said detecting surface a corresponding raster;
the length of said signal representation in said display is not greater than one-half the length of any line in said raster;
and including further:
means to display said combination of signal and noise in duplicate displays are displaced sufficiently far with respect to each other that at least one of the duplicate displays of any one signal is wholly located upon one raster line,
whereby autocorrelation functions due to projection through said replica of radiation from signal representations located wholly upon one raster line appear in the central portion of said detecting surface raster, and
whereby projections of portions of signal representations not located wholly upon one raster line appear in the edge portions of said detecting surface raster; and
means to limit the scope of said detecting surface scanning means to said central portion of said detecting surface raster.

11. The apparatus of claim 2 in which values of said at least one parameter may be modified by a characteristic which may assume any value within a given range and wherein:
said intensity modulating means comprises a storage medium bearing a plurality of spaced replicas of said signal in the form of portions having varying radiation transmission characteristics, in which
the position of each point on each said replica corresponds to a particular point in time,
the transmissibility of said storage medium to said radiation at each said point corresponds to a value of said at least one parameter for said particular point in time in such a way that parameter values of a sense to be represented by increased radiation from said radiating surface are represented by increased radiation transmissibility of said storage medium,
the values of said at least one parameter in each replica correspond to the values of said parameter in said signal as modified by a particular value of said characteristic, with the values of said modifying characteristic corresponding to said plurality of replicas being spaced over said given range of expected values, and
said storage medium is adapted to block the transmission of said radiation everywhere but through said signal replicas;
said means for projecting said radiation upon said detection surface comprises means for converging said radiation upon said detection surface,
whereby a signal displayed upon said radiating surface projects through said plurality of replicas a corresponding plurality of intensity functions upon said detection surface, with the value of modifying characteristic of one of said replicas closely matching the value of modifying characteristic of said displayed signal so that the corresponding intensity function projected through said closely matching replica is close to the autocorrelation function of said displayed signal.

12. The apparatus of claim 11 in which:
said display surface comprises the surface of a cathode ray tube;
said radiation comprises visible light; and
said detection surface comprises the light sensitive surface of a vidicon tube.

13. The apparatus of claim 11 in which:
said displayed signal is of the form $\cos(\omega_d t + \varphi)f(t)$,
where $\omega_d$ represents any frequency within a known frequency range and $\varphi$ represents an unknown phase angle;
said plurality of replicas comprise sine and cosine groups of equal numbers of replicas,
the replicas of said sine group being of the form $\sin(\omega_1 t)f(t), \sin(\omega_2 t)f(t), \ldots, \sin(\omega_i t)f(t)$, where $\omega_1, \omega_2, \ldots, \omega_i$ are discrete frequencies spaced throughout said known frequency range, and
the replicas of said cosine group being of the form $\cos(\omega_1 t)f(t), \cos(\omega_2 t)f(t), \ldots, \cos(\omega_i t)f(t)$, where $\omega_1, \omega_2, \ldots, \omega_i$ correpond in identical one-to-one relationship to the frequencies in said sine group;
and including:
means to convert said intensity functions projected upon said detection surface into electrical signals;
means to square said electrical signals; and
means to align in time and add said squared electrical signals representing corresponding pairs of projected intensity functions, one each from said sine and cosine groups, having the same $\omega$ frequency.

14. The apparatus of claim 13 in which:
said display surface comprises the surface of cathode ray tube;
said radiation comprises visible light;
said variable intensity radiation display is in the form of a raster of parallel lines; and
said detection surface comprises the surface of a vidicon tube,
whereby there is projected upon said vidicon tube face a plurality of rasters, each formed by the projection of light radiated from said cathode ray tube raster display through a separate one of said replicas.

15. A system in accordance with claim 1 and wherein:
said variable intensity radiation display is in the form of a raster of parallel lines,
said raster comprising two sub-rasters;
the length of said signal in said display is not greater than one-half the length of any line in said raster;
said combination of signal and noise is displayed on both said sub-rasters, the positions of portions of said combination on one of said sub-rasters being displaced sufficiently far with respect to the positions of the same portions on the other of said sub-rasters that any signal is always displayed wholly upon a single line of at least one of said sub-rasters; and
said detection means is not responsive to radiation emanating from any signal display which is not wholly presented upon a single raster line.

16. A system in accordance with claim 15 and wherein:
said detection means includes
a substantially planar detecting surface extending substantially parallel to said surface on which said variable intensity radiation is presented, and
means for scanning said detection surface and detecting the intensity of said radiation incident thereon;
said sub-rasters are rectangular and are interlaced to form said raster,
so that alternate lines of said raster belong to different ones of said sub-rasters;
and including further:
means for projecting said radiation from said display surface through said modulating means and upon said detection surface in such a manner that there exists a one-to-one correspondence between spaces on said radiating surface and on said detection surface,
whereby there is projected upon said detecting surface a corresponding raster comprising two interlaced rectangular sub-rasters;
and wherein further:
said detection means includes means for scanning only that portion of said corresponding raster projected upon said detecting surface on which may appear intensity modulated radiation emanating from signals which are wholly displayed upon a single raster line.

References Cited

UNITED STATES PATENTS

| | | | |
|---|---|---|---|
| 2,712,415 | 7/1955 | Piety | 235—198 X |
| 2,787,188 | 4/1957 | Berger | 235—181 |
| 2,994,779 | 8/1961 | Brouillette | 235—198 X |
| 3,074,634 | 1/1963 | Gamo | 235—181 X |
| 3,111,666 | 11/1963 | Wilmotte | 235—181 X |
| 3,211,898 | 10/1963 | Fomenko | 235—181 |
| 3,184,679 | 5/1965 | Kuehne | 235—181 X |
| 3,274,380 | 9/1966 | Moskowitz | 235—183 |
| 3,274,549 | 9/1966 | Moskowitz | 340—146.3 |

MALCOLM A. MORRISON, *Primary Examiner.*

I. KESCHNER, *Examiner.*